UNITED STATES PATENT OFFICE.

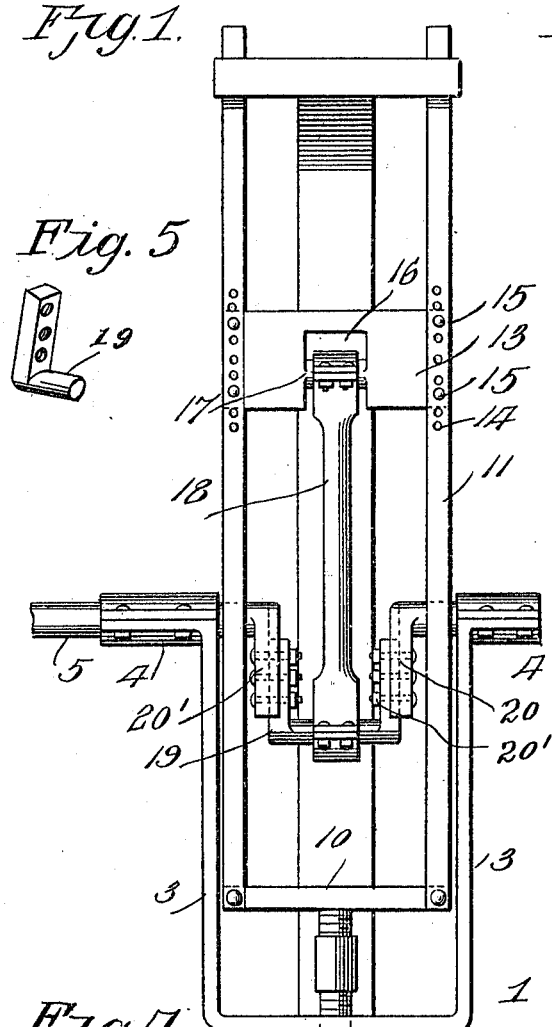

ROBERT B. CUMMINS, OF STERLING CITY, TEXAS.

WINDMILL-DRIVE.

952,979. Specification of Letters Patent. Patented Mar. 22, 1910.

Application filed February 19, 1908. Serial No. 416,711.

*To all whom it may concern:*

Be it known that I, ROBERT B. CUMMINS, a citizen of the United States, residing at Sterling City, in the county of Sterling and State of Texas, have invented new and useful Improvements in Windmill-Drives, of which the following is a specification.

This invention relates to a wind mill drive, the object being to provide a drive for windmills whereby the rotary motion of its shaft is converted into a reciprocatory motion of the plunger rod, the parts being so arranged as to produce a perfect alinement of the movable parts and a perfect and steady slidable motion of the reciprocating member.

Another object of the invention is to provide a windmill drive having its working parts so arranged as to be readily regulated to produce a long or short stroke of the plunger rod connected to the device.

To these and other ends the invention resides in the novel construction of parts and their arrangement in operative combination hereinafter fully described and claimed.

In the accompanying drawings, Figure 1 is a front elevation of a wind mill drive constructed in accordance with my invention. Fig. 2 is a side elevation of the same. Fig. 3 is a top plan view of the same. Figs. 4 and 5 illustrate details.

Referring particularly to Figs. 1, 2 and 3 of the drawings the numeral 1 designates the upper frame of a windmill constructed in accordance with my invention, provided with the body portion 2 having upwardly extending arms 3 provided with the offsets 4, semi-cylindrical in cross section, and adapted to form the lower bearings for the operating shaft 5 of the wind wheel. The frame 1 has its body portion 2 provided with a rearwardly extending arm 6, having an upward extension 7 terminating in a transversely arranged head 8, extending from each side of the extension 7.

The body portion 2 of the frame 1 is provided with a central opening adapted for the reception of a reciprocating plunger rod 9, having its lower end secured to a pump, not shown, and its upper end secured to a plunger rod head 10, having the vertical spaced arms 11, preferably four in number, two of which are arranged upon each side of the plunger rod, adjacent to the arms 3 of the frame 1, and have their upper ends working in openings 12 provided by the head 8 of the frame.

The arms 11 are arranged in pairs upon each side of the frame and are sufficiently spaced apart to receive therebetween a pitman head 13. This pitman head 13 is provided near each of its ends with a series of perforations adapted to correspond with a series of perforations 14 arranged upon each pair of arms, and adapted for the reception of bolts or retaining elements 15, by which the head is secured between the arms. The pitman head 13 is provided with a central opening 16, and centrally arranged within this opening is a cylindrical bar 17 to which a pitman 18 is adapted to be secured. The opposite end of the pitman 18 is adapted to engage the crank member 19 of the operating shaft 5 of the wind wheel. The crank 19 has both of its extending arms provided with a series of perforations, and the depending arm of the operating shaft 5 is provided with a centrally arranged channel, and a series of perforations corresponding with those of the crank 19. Upon the opposite side of the frame to that of the depending arm of the operating shaft is an L-shaped member 20, having one of its members cylindrical in cross section and adapted for engagement with one of the bearings 4 provided by the arms 3 of the frame. The other arm of the member 20 is provided with a channel corresponding with that of the depending arm of the operating shaft 5, and is also provided with a series of perforations similar to those arranged upon the depending member of the operating arm and the arms of the crank 19. The arms 19 are adapted for engagement within the channels provided by the arm of the operating shaft and that of the member 20, and are secured between these members by a series of bolts or retaining members 20' arranged within the perforations previously referred to. By providing the arms of the U shaped crank 19 with a series of perforations corresponding to and alining with the perforations of the right angular extension of the operating shaft 5 and the right angular channeled arm of the member 20, it will be readily understood that a longer or a shorter stroke may be given to the crank and plunger rod of the wind mill by merely changing the retaining elements 20' and 15 and arranging these elements in different openings, a different sized pitman 18 being substituted when such change is desired. It will be also seen that by the arrangement of the spaced arms 11 of the plunger head operating within the openings within the head of the frame and engaging either side of the operating shaft 5 and the extension 20, the plunger rod 9 is reciprocated in a perfectly vertical direction, and that sagging or wabbling of the parts is entirely overcome.

Having thus fully described the invention what is claimed as new is:

In a windmill drive, a frame, said frame being provided with a pair of side arms and a central arm projecting above the side arms, the lower portion of the frame being provided with an opening adapted for the reception of a pump rod, a second frame removably connected with the pump rod, this frame having its sides each comprising a pair of spaced arms, an adjustable block mounted between the spaced arms, the central arm of the first frame having an offset projecting portion provided with openings to receive the rods of the second frame, a link connected with the block positioned between the arms of the second frame, a U-shaped member secured to the free end of the link, the side arms of the main frame being provided with offset portions adapted to serve as bearings, a divided shaft having offset ends positioned within these bearings, and means for connecting the said offset members of the shaft with the U shaped member connected with the link.

In testimony whereof I affix my signature in presence of two witnesses.

ROBERT B. CUMMINS.

Witnesses:
J. W. TWEEDLE,
H. H. HOOKER.